US011163973B2

(12) United States Patent
Sanni

(10) Patent No.: US 11,163,973 B2
(45) Date of Patent: Nov. 2, 2021

(54) BIOMETRIC IDENTITY AUTHENTICATION SYSTEM

(71) Applicant: Adedayo Sanni, Lawrenceville, GA (US)

(72) Inventor: Adedayo Sanni, Lawrenceville, GA (US)

( * ) Notice: Subject to any disclaimer, the term of this patent is extended or adjusted under 35 U.S.C. 154(b) by 121 days.

(21) Appl. No.: 15/849,058

(22) Filed: Dec. 20, 2017

(65) Prior Publication Data

US 2018/0173935 A1 Jun. 21, 2018

Related U.S. Application Data

(60) Provisional application No. 62/436,506, filed on Dec. 20, 2016.

(51) Int. Cl.
| | |
|---|---|
| *G06K 9/00* | (2006.01) |
| *G06Q 20/40* | (2012.01) |
| *G07F 19/00* | (2006.01) |
| *G07C 9/00* | (2020.01) |
| *G06Q 20/18* | (2012.01) |
| *G07C 9/26* | (2020.01) |
| *G07C 9/25* | (2020.01) |

(52) U.S. Cl.
CPC ......... *G06K 9/00087* (2013.01); *G06Q 20/18* (2013.01); *G06Q 20/4012* (2013.01); *G06Q 20/40145* (2013.01); *G07C 9/00* (2013.01); *G07F 19/201* (2013.01); *G07C 9/257* (2020.01); *G07C 9/26* (2020.01)

(58) Field of Classification Search
CPC ...... G06Q 20/04; G06Q 20/40; G06Q 20/401; G06Q 20/4012; G06Q 20/4014; G06Q 20/40145
See application file for complete search history.

(56) References Cited

U.S. PATENT DOCUMENTS

| | | | |
|---|---|---|---|
| 7,604,166 B2 | 10/2009 | Abouyounes | |
| 9,847,999 B2 * | 12/2017 | Van Os | ................... G06F 21/10 |
| 2003/0149661 A1 * | 8/2003 | Mitchell | ................ G06Q 20/10 |
| | | | 705/39 |
| 2006/0080525 A1 * | 4/2006 | Ritter | ................ H04W 12/0605 |
| | | | 713/155 |

(Continued)

OTHER PUBLICATIONS

M. Gordon and S. Sankaranarayanan, "Biometric security mechanism in Mobile paymentts," 2010 Seventh International Conference on Wireless and Optical Communications Networks—(WOCN), Colombo, 2010, pp. 1-6, doi: 10.1109/WOCN.2010.5587318. (Year: 2020).*

*Primary Examiner* — Carlos Garcia
(74) *Attorney, Agent, or Firm* — Boudwin Intellectual Property; Daniel Boudwin

(57) ABSTRACT

A system for authenticating the identity of a user at a transaction terminal including a fingerprint scanner and a keypad, both operably connected to a microcontroller. The microcontroller is integrated with a transaction terminal and is adapted to allow a user to access the transaction terminal upon authentication of the identity of the user. Authentication of the identity of the user is accomplished by recording an image of a fingerprint of the user, comparing that recorded image to a database of fingerprint images, receiving an input from a user via a keypad, the input corresponding to a personal identification number, and determining whether the personal identification number and fingerprint match an authorized user.

6 Claims, 4 Drawing Sheets

(56) References Cited

U.S. PATENT DOCUMENTS

| | | |
|---|---|---|
| 2009/0177586 A1 | 7/2009 | Niklan |
| 2010/0306106 A1 | 12/2010 | Dagan |
| 2010/0332400 A1 | 12/2010 | Etchegoyen |
| 2011/0057034 A1* | 3/2011 | Maxwell ............... G06Q 20/346 |
| | | 235/382 |
| 2011/0320037 A1 | 12/2011 | Frugone |
| 2015/0046328 A1 | 2/2015 | Mitra |
| 2017/0063851 A1* | 3/2017 | Kim ...................... H04W 12/06 |

* cited by examiner

BIOMETRIC IDENTITY AUTHENTICATION SYSTEM

CROSS REFERENCE TO RELATED APPLICATIONS

This application claims the benefit of U.S. Provisional Application No. 62/436,506 filed on Dec. 20, 2016. The above identified patent application is herein incorporated by reference in its entirety to provide continuity of disclosure.

BACKGROUND OF THE INVENTION

The present invention relates to biometric identity (ID) authentication systems. Specifically, the present invention relates to a biometric identity authentication system that utilizes a fingerprint scanner in addition to an entry of a personal identification number (PIN) on a keypad, wherein the present invention allows access to a transaction terminal, e.g. a point-of-sale electronic tender terminal.

Current systems of authenticating the identity of a person at a transaction terminal mainly rest upon verifying a personal identification number entered into a keypad by the person. In addition, some systems utilize the reading of physical devices carried by the user and inserted into the transaction terminal, such as a credit card. One example of a system that utilizes both of these identity authentication means is found in an automatic teller machine (ATM).

To improve the efficacy of the current systems, several systems utilizing fingerprint scanners have been proposed. Some of the systems provide a fingerprint scanner for use with a financial institution, whereby an individual scanning his or her fingerprint is provided access to their account information upon providing a correct fingerprint profile to the fingerprint scanner. However, these systems fail to provide a system having a fingerprint scanner configured to verify the identity of a person at a transaction terminal. Thus, a fingerprint scanner system that eliminates the need for a physical debit or credit card at a transaction terminal is desirable.

SUMMARY OF THE INVENTION

In view of the foregoing disadvantages inherent in the known types of biometric identity authentication systems now present in the prior art, the present invention provides a biometric identity authentication system wherein the same can be utilized for providing convenience for the user when making a secure transaction at a transaction terminal. The present system comprises a fingerprint scanner configured to record an image of a fingerprint and a keypad for receiving user input. The fingerprint scanner and the keypad are operably connected to a microcontroller. The microcontroller is configured to take the steps of comparing the recorded image of the fingerprint to a database of fingerprint images and determining whether the recorded image of the fingerprint matches a fingerprint stored in the database. The database stores authorized user profiles comprised of a PIN and a stored fingerprint image. Upon receiving a PIN via the keypad, the microcontroller is further configured to determine whether the entered PIN corresponds to the PIN of the authorized user profile of the scanned fingerprint. The microcontroller further grants access to financial account information if the microcontroller has determined that both the scanned fingerprint and the PIN match the same authorized user profile.

One object of the present invention is to provide a biometric identity authentication system that ensures the identity of a person attempting to make a transaction at a transaction terminal is an identity of an authorized person via a fingerprint scan and a PIN, whereby the fingerprint and PIN are compared to a database containing authorized user profiles which include stored fingerprint images and a PIN.

Another object of the present invention is to provide a biometric identity authentication system that can be configured to work with existing transaction terminals.

Yet another object of the present invention is to provide a biometric identity authentication system that utilizes either a capacitive fingerprint scanner or an optical fingerprint scanner.

A further object of the present invention is to provide a biometric identity verification system that includes a fingerprint scanner, a keypad, and a pulse sensor.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
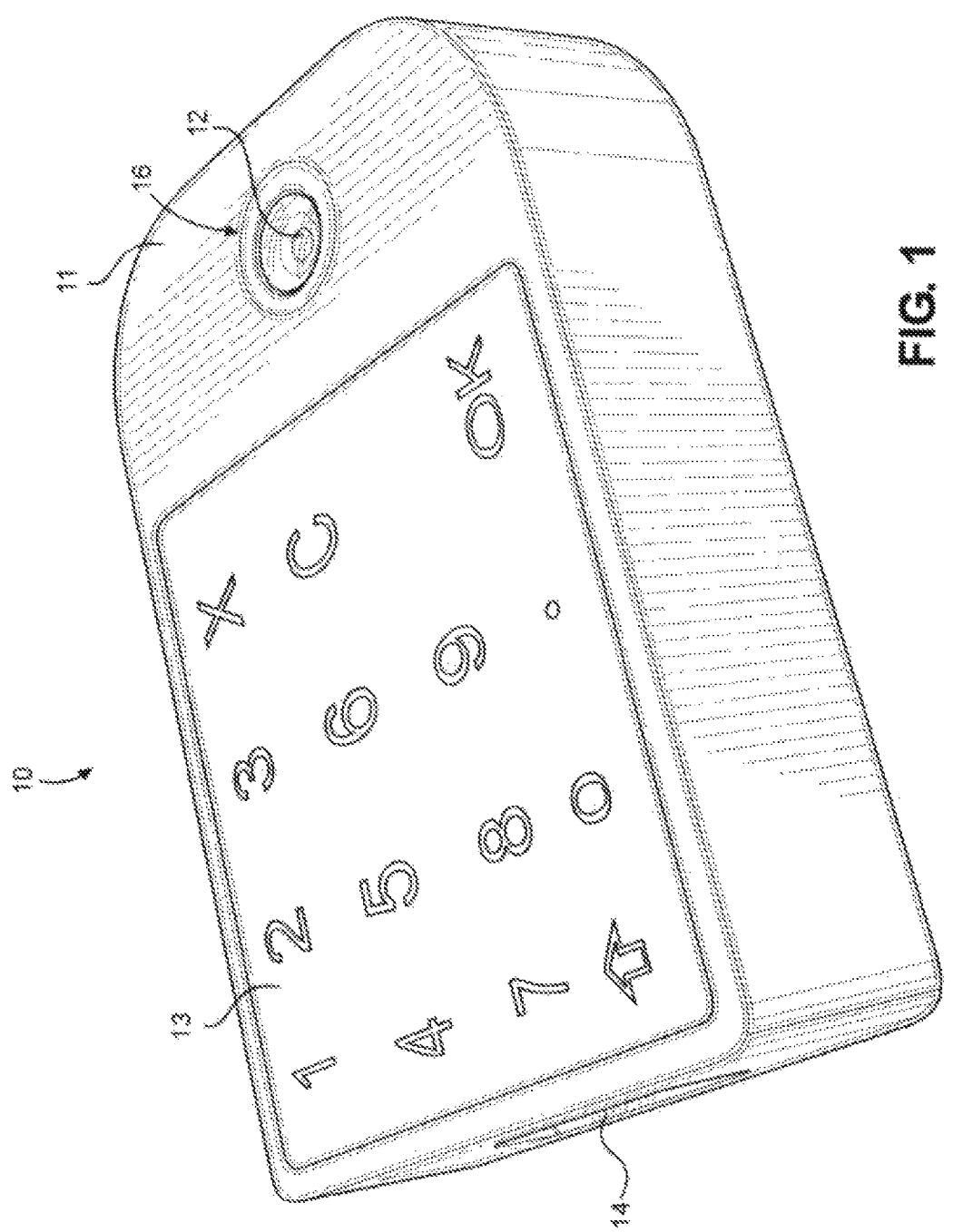
FIG. 1 shows a perspective view of an embodiment of the biometric identity authentication system.

Reference is made herein to the attached drawings. Like reference numerals are used throughout the drawings to depict like or similar elements of the biometric identity authentication system. The figures are intended for representative purposes only and should not be considered to be limiting in any respect. Unless specifically limited to a single unit, "a" is intended to be equivalent to "one or more" throughout the present disclosure.

Figure 2:
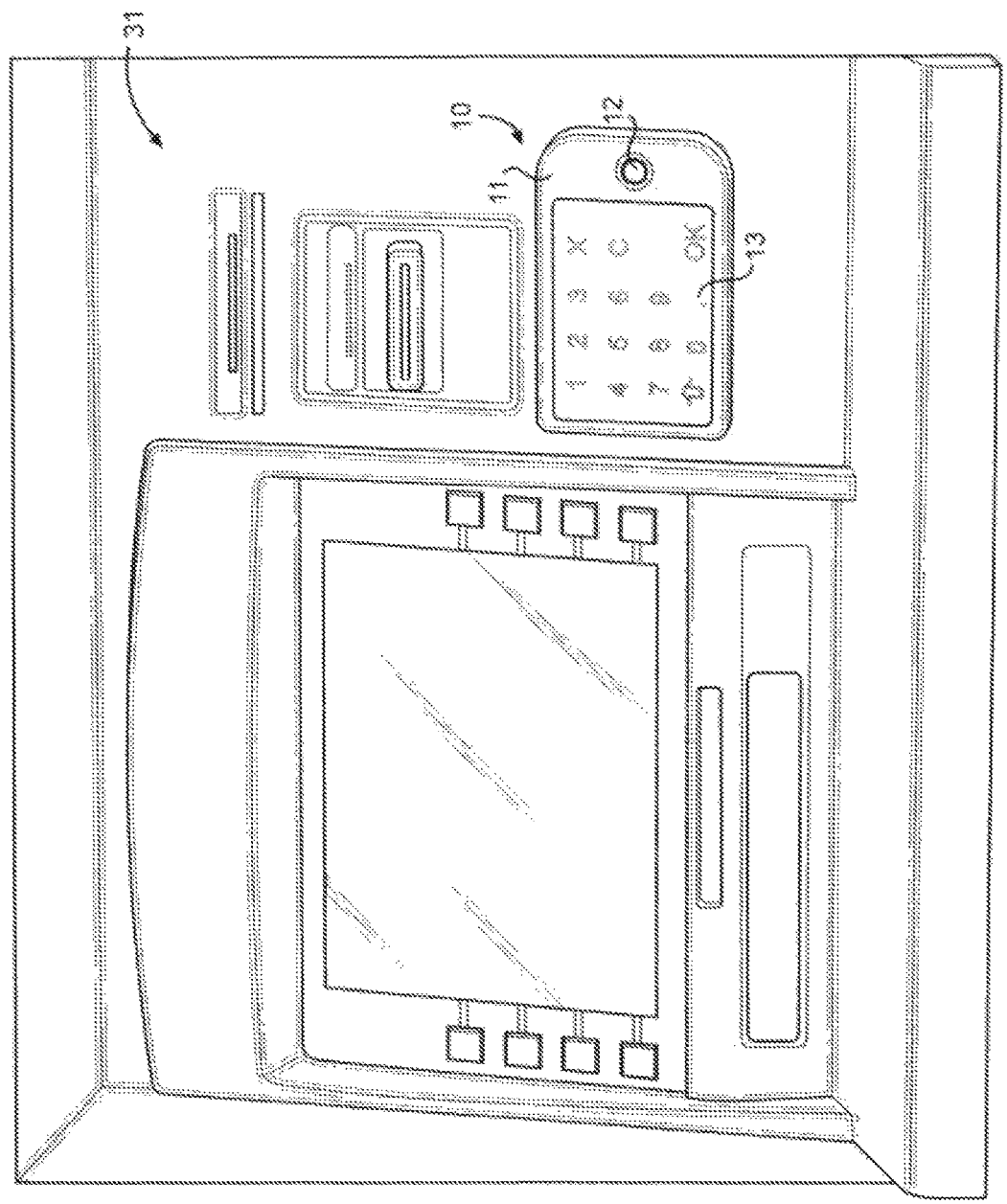
FIG. 2 shows an isometric view of an embodiment of the biometric identity authentication system integrated into an ATM terminal.

Referring now to FIGS. 1 and 2, there is shown a perspective view of an embodiment of the biometric authentication system and an isometric view of an embodiment of the biometric authentication system integrated into an ATM terminal, respectively. The biometric authentication system 10 comprises a fingerprint scanner 12 and a keypad 13. In one embodiment, the fingerprint scanner 12 is an optical fingerprint scanner. In certain optical scanner embodiments, the fingerprint scanner utilizes infrared waves to image the fingerprint of a user, wherein the infrared waves are emitted from the scanner at the finger of a user and the reflections of those infrared waves produced by the finger are detected and plotted by the scanner to produce the image of the user's fingerprint. In another embodiment, the fingerprint scanner 12 is a capacitive fingerprint scanner. In the illustrated embodiment, the keypad 13 and the fingerprint scanner 12 are contained by a housing 11. The fingerprint scanner 12 is configured to be actuated when a user places his or her finger on a pad 16 that is pressure, capacitance or heat sensitive. In some other embodiments, the fingerprint scanner 12 is actuated by a switch disposed on the housing 11.

As seen in FIG. 2, the housing 11 can be attached to an existing transaction machine 31. This can be accomplished by hardwiring the fingerprint scanner 12 and the keypad 13 to the transaction machine through a connection port 14 in the housing 11. The biometric identity authentication system 10 can replace the existing keypad on the transaction machine 31. Due to the secure nature of the present biometric identity authentication systems, a bank may choose to provide a user with a choice regarding the means for accessing financial account information. For example, a bank may allow a user to choose between utilizing a debit or credit card reader, or utilizing the fingerprint scanner 12 provided in the biometric identity authentication system 10. Both means of access can exist on the same transaction machine 31, as shown in FIG. 2. In addition, the biometric identity authentication system 10 can be integrated into new transaction machines, eliminating the need for a debit or credit card reader therein.

Figure 3:
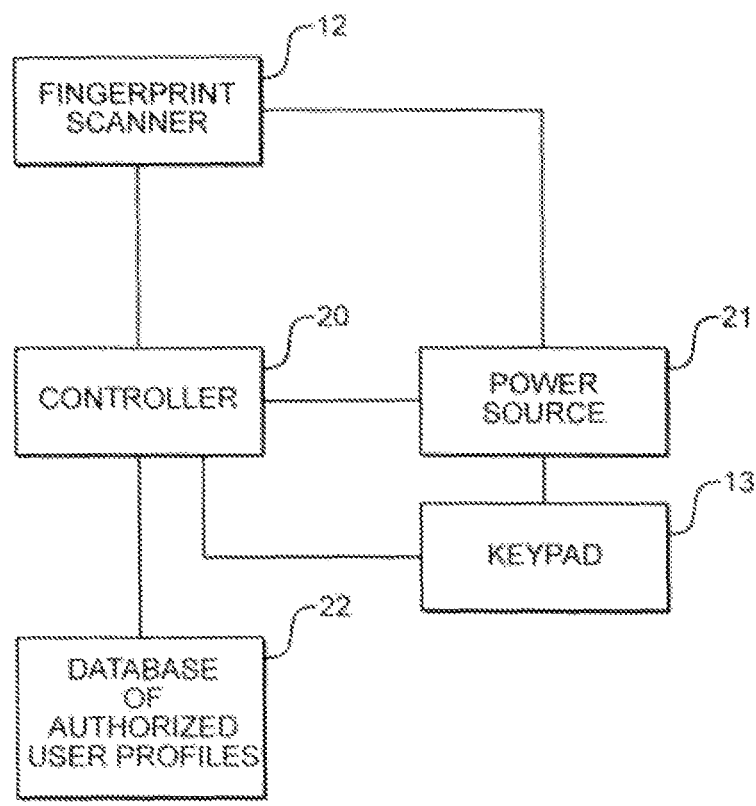
FIG. 3 shows a block diagram of the embodiment of the biometric identity authentication system shown in FIG. 1.

Referring now to FIG. 3, there is shown a block diagram of the embodiment of the biometric identity authentication system shown in FIG. 1. The keypad 13 and the fingerprint scanner 12 are operably connected to a microcontroller 20. Each of these are connected to a power source 21. Once the fingerprint scanner 12 is actuated, the fingerprint scanner 12 records an image of the fingerprint of the user. The microcontroller 20 then queries a database 22 to determine whether the recorded image of the fingerprint matches the stored fingerprint of an authorized user, wherein the database 22 includes an authorized user profile or a plurality of authorized user profiles comprising of at least a stored fingerprint image and a stored PIN.

Next, a PIN is entered on the keypad 13 by the user. The entered PIN is received by the microcontroller 20, which then compares the received PIN to the stored PIN in the database 22. The microcontroller 20 is configured to allow access to the transaction terminal if both the recorded image of the fingerprint and the received PIN matches that of the same authorized user profile.

The microcontroller 20 can be programmed with a software to enable compatibility with an existing transactional machine such as an ATM. This software includes language that permits the biometric identity authentication system to query a database of a bank, e.g. a bank that owns the transaction machine, to retrieve financial account information. This financial account information can include a PIN associated with a user's financial account. In some embodiments, the bank database is the database 22 containing authorized user profiles. So, in practice, the present biometric identity authentication system 10 could reduce or eliminate the need for people to carry physical credit or bank cards.

Figure 4:
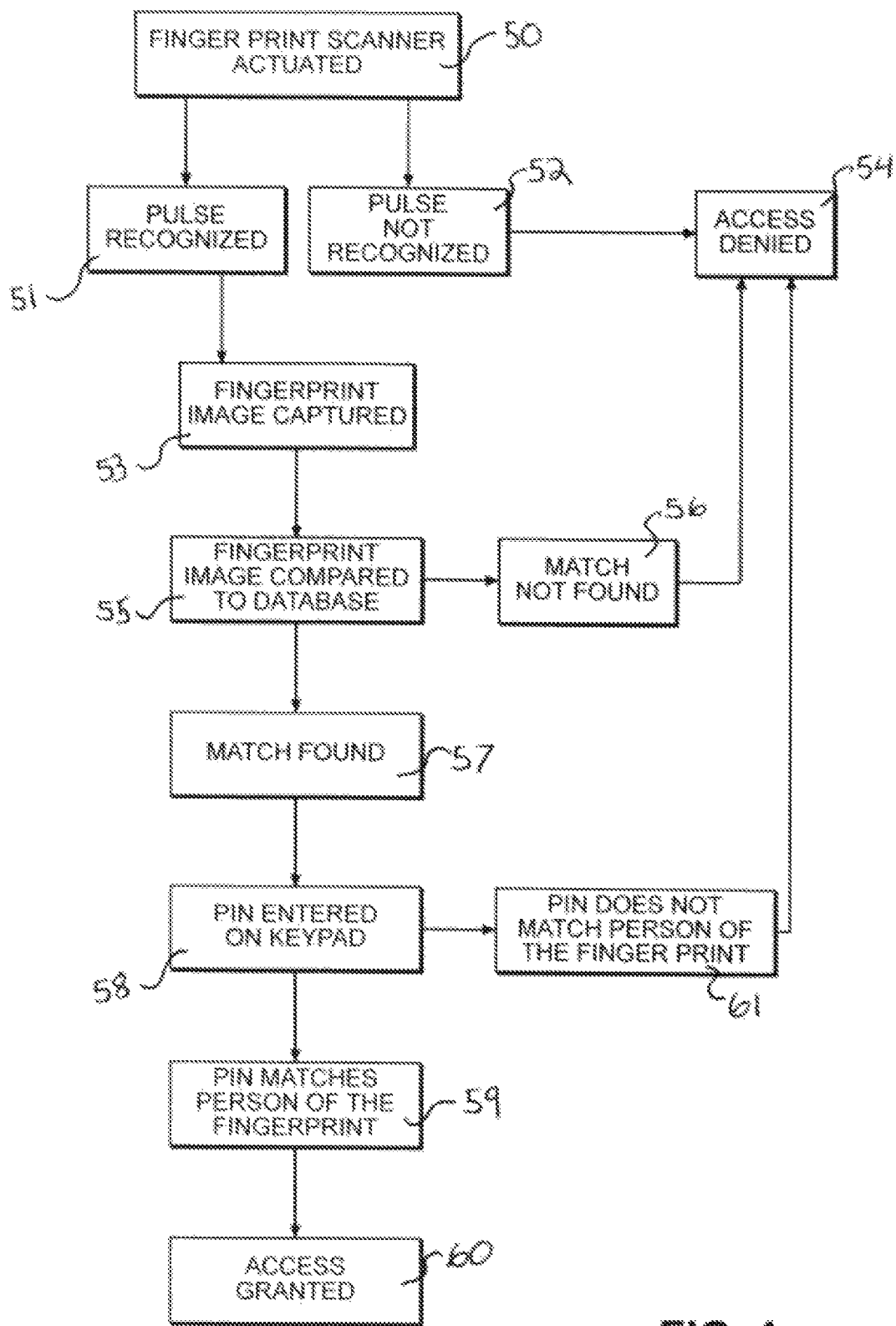
FIG. 4 shows a flow diagram of an alternative embodiment of the biometric authentication system and an associated method.

Referring now to FIG. 4, there is shown a flow diagram of an alternative embodiment of the biometric authentication system and an associated method. In some embodiments, the fingerprint scanner is configured to sense a pulse of a user. This pulse sensing can be accomplished by having the pad 16, see FIG. 1, as an oximeter. Or, in the embodiments which utilize a capacitive fingerprint scanner, the fingerprint scanner is also an electrocardiogram, i.e. an electrode that detects electrical activity on the skin of a user, wherein the electrical activity is generated by heart muscle depolarizations.

To begin the process of accessing a transaction machine in this embodiment, the fingerprint scanner is actuated 50 by the user. Once the pulse of a user is recognized 51, the fingerprint scanner captures 53 an image of the fingerprint of the user. If a pulse is not recognized 52 access to the transaction machine is denied 54. As discussed previously, that recorded fingerprint image is then compared 55 to fingerprint images stored in the database of authorized user profiles. If no matches are found 56, access to the transaction machine is denied 54. If a fingerprint image match is found 57, the PIN entered 58 on the keypad by the user is compared to the stored PIN of the authorized user profile corresponding to the recorded and stored fingerprint images. If the entered PIN does not match 61, access to the transaction machine is denied 54. If a pulse is found and both the recorded fingerprint image and PIN match 59 that of an authorized user profile, the biometric identity authentication system grants the user access 60 to the transaction terminal.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, system and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A biometric identity authentication system, consisting of:
    a fingerprint scanner configured to record an image of a fingerprint;
    a database storing an authorized user profile, wherein the authorized user profile consists of a stored fingerprint image and a stored personal identification number;
    a keypad;
    wherein the keypad and the fingerprint scanner are disposed in a housing on a front side of the housing;
    a connection port disposed on the housing configured to operably connect the fingerprint scanner and keypad an automatic teller machine;
    wherein the housing is mounted to the automatic teller machine;
    a microcontroller operably connected to the fingerprint scanner and the keypad, wherein the microcontroller is configured to cause the biometric identity authentication system to perform a method, the method comprising:
    comparing a recorded image of the fingerprint to the stored fingerprint image in the database;
    determining whether the recorded image of the fingerprint matches the stored fingerprint image in the database;
    receiving a personal identification number via the keypad;
    determining whether the entered personal identification number matches the stored personal identification number in the database;

if the recorded image of the fingerprint matches the stored fingerprint image and the received personal identification number matches the stored personal identification number, then allowing access to a transaction facilitated by the automatic teller machine.

2. The biometric identity authentication system of claim 1, wherein the fingerprint scanner is a capacitive sensor.

3. The biometric identity authentication system of claim 1, wherein the fingerprint sensor is an optical sensor.

4. The biometric identity authentication system of claim 1, wherein the fingerprint scanner is configured to sense a pulse of a user, wherein the fingerprint scanner actuates upon sensing a pulse.

5. The biometric identity authentication system of claim 1, wherein the database includes at least one user profile including financial account information associated with a stored fingerprint image.

6. The biometric identity authentication system of claim 1, wherein the connection port is disposed on a lateral side of the housing, disposed orthogonally relative to the keypad and the fingerprint scanner.

\* \* \* \* \*